Feb. 13, 1951     H. J. FINDLEY     2,541,227
ENGINE HEAT BOOSTER BRAKE
Filed April 12, 1949     3 Sheets-Sheet 1
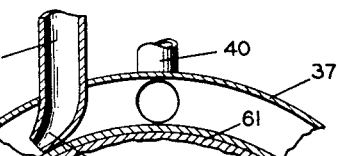
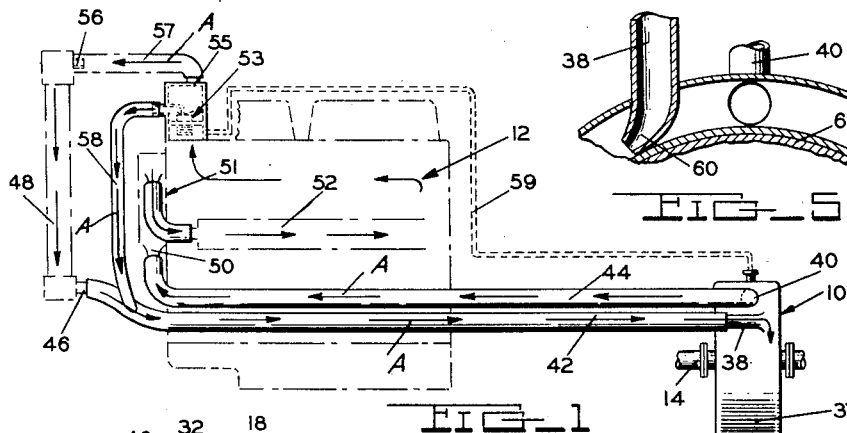
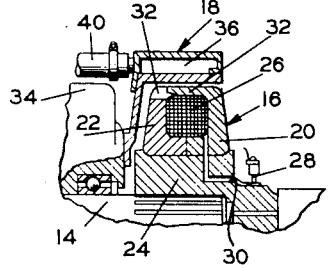
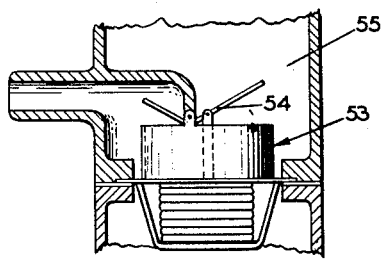
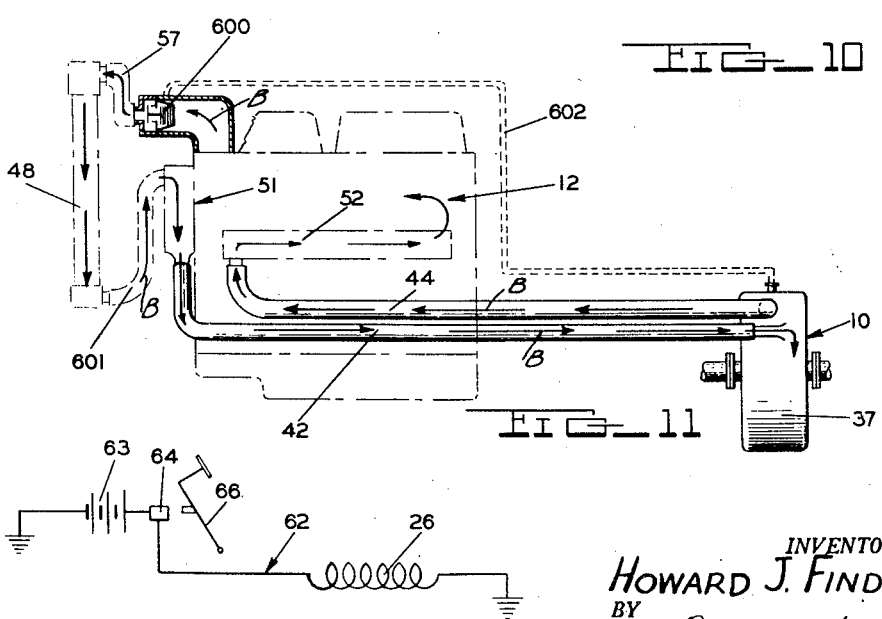
INVENTOR.
HOWARD J. FINDLEY
BY
McDonald & Teagno
ATTORNEYS Feb. 13, 1951 H. J. FINDLEY 2,541,227
ENGINE HEAT BOOSTER BRAKE
Filed April 12, 1949 3 Sheets-Sheet 2

INVENTOR.
HOWARD J. FINDLEY
BY
McDonald & Feagns
ATTORNEYS

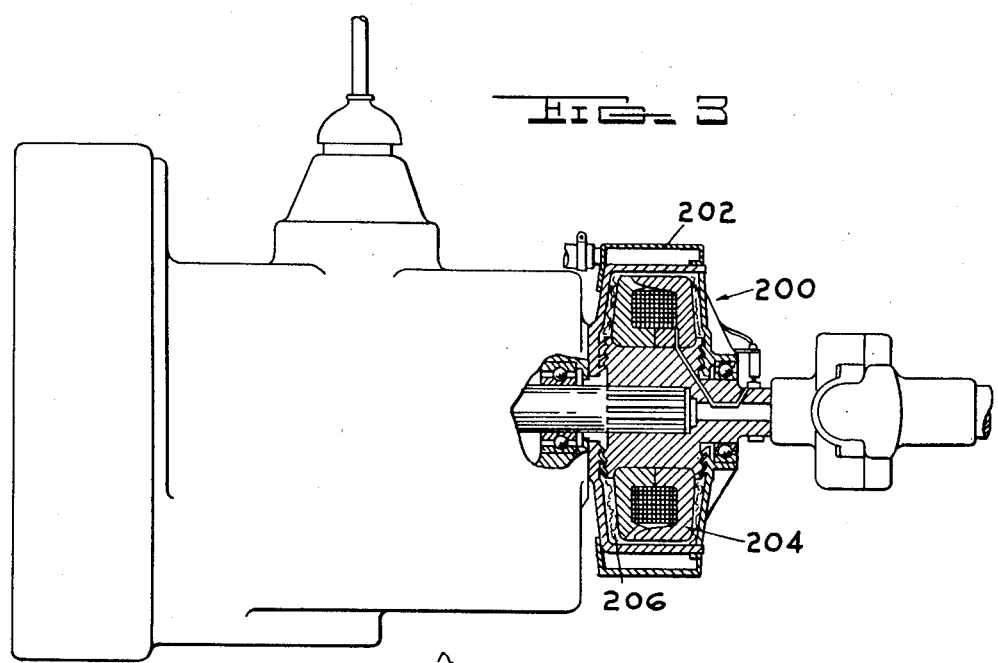
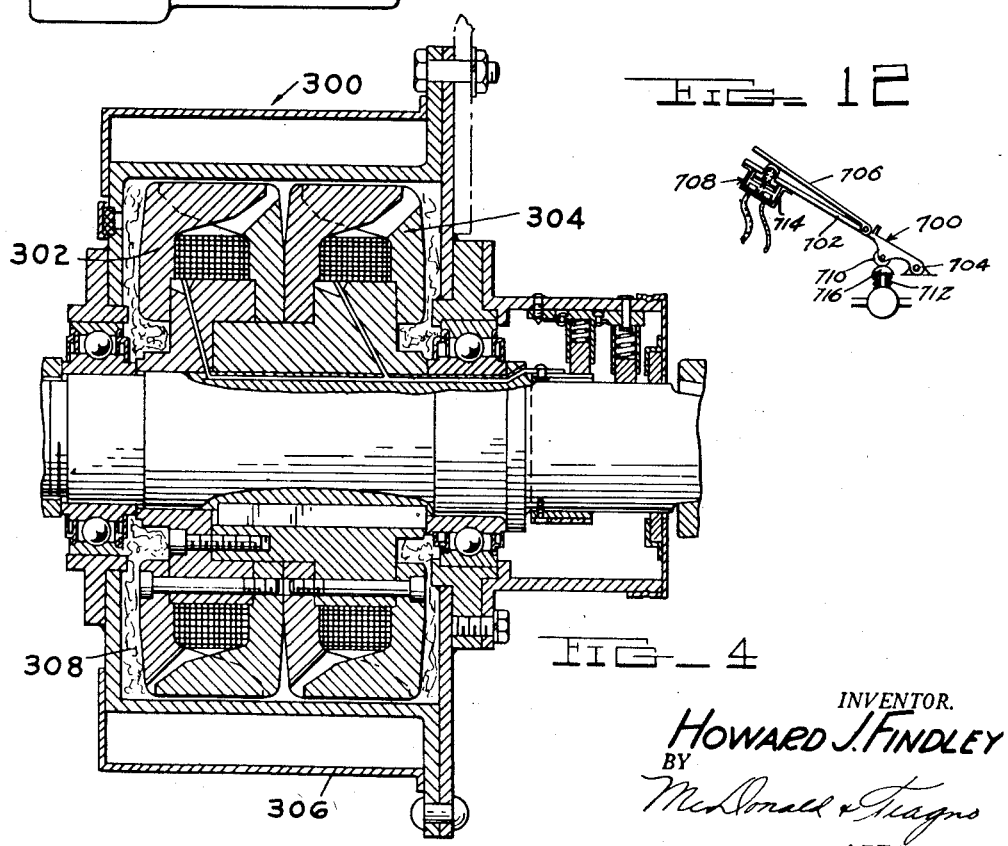

Patented Feb. 13, 1951

2,541,227

UNITED STATES PATENT OFFICE 2,541,227

ENGINE HEAT BOOSTER BRAKE

Howard J. Findley, Chardon, Ohio, assignor to Eaton Manufacturing Company, Cleveland, Ohio, a corporation of Ohio Application April 12, 1949, Serial No. 87,104

15 Claims. (Cl. 123—142.5)

This invention relates to automotive vehicles and more particularly to power absorption braking mechanism associated with the power plant for the vehicle and a driven member of the vehicle.

Broadly the invention comprehends the provision of power absorption braking means of the electromagnetic or like type adapted to be utilized in connection with liquid cooled vehicle engines effective as a combination auxiliary vehicle brake means and engine cooling liquid, heating means.

An object of the invention is the provision of a power absorption braking mechanism adapted to be utilized in association with a liquid cooled engine propelled vehicle as an effective auxiliary braking means therefor and as a means for simultaneously heating the liquid circulated through the engine providing for the improved operation thereof.

Another object of the invention is the provision of a power absorption braking mechanism, of the type wherein energy produced by a mechanical means is converted by electrical means into heat by means of relatively rotatable means, adapted to be utilized as an auxiliary braking means for an internal combustion engine driven vehicle and wherein the heat generated by the relatively rotatable means is dissipated into the liquid circulating cooling system of the engine effective to raise the temperature of the liquid in the cooling system and thus provide for an efficient operation of the engine.

A further object of the invention is the provision of an electromagnetic eddy current induced power absorption braking mechanism adapted to be utilized in association with an internal combustion engine driven vehicle and having a member thereof driven by a driven element of the vehicle for utilization as an auxiliary braking mechanism for the vehicle and as a heat booster for the liquid of the engine circulating system, said power absorption mechanism being operably controlled by switch means in an electrical supply circuit therefor, said switch means being manually operated.

A yet further object of the invention is the provision of a magnetic induced power absorption braking mechanism adapted to be utilized in association with a vehicle engine wherein the input member of the mechanism is driven directly off the crankshaft or like power output member of the engine and the heat generated by the mechanism is dissipated to the liquid cooling medium of the engine, said mechanism being controllable for operation by manual switch means in the electrical supply circuit therefor effective to permit of a quick warm up of the engine in the starting thereof or in maintaining the engine at higher operating temperatures when idling or when not under load.

Other and further important objects and advantages of this invention will be apparent from the following description taken in connection with the drawings forming a part of the specification and in which:

Fig. 1 is a side plan diagrammatic view of an electromagnetic power absorption mechanism as arranged in association with a liquid cooled vehicle engine and especially with regard to the cooling system thereof;

Fig. 3 is a vertical cross-sectionalized view of a modified form of mechanism from that of Figs. 1 and 2 in association with the output shaft of a vehicle transmission;

Fig. 4 is a vertical cross-sectionalized view of a dual electromagnetic power absorption braking mechanism of the variety illustrated by Fig. 1;

Fig. 5 is a fragmentary cross-sectionalized view of a portion of the electromagnetic power absorption unit disclosed by Fig. 1 showing the inlet and outlet fluid connections thereof;

Fig. 6 is a diagrammatic illustration of an electric circuit for the power absorption mechanisms illustrated;

Fig. 7 is an enlarged fragmentary view of the power absorption unit illustrated by Fig. 1;

Fig. 10 is a fragmentary enlarged cross-sectional view of the by-pass thermostat utilized in connection with the engine cooling system of Fig. 1;

Figure 8:
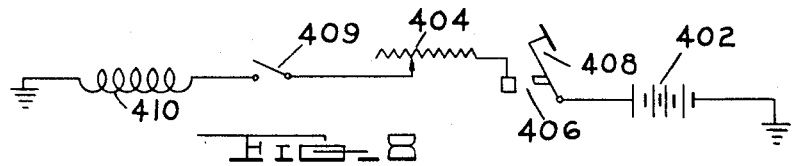
Fig. 8 is a modified form of electrical circuit for control of operation of any of the illustrated mechanisms of Figs. 1, 2, 3, and 4.

Fig. 11 is a side plan diagrammatic view of an alternate form of arrangement of an electromagnetic power absorption mechanism in association with the cooling system of a liquid cooled engine from that shown in Fig. 1; and Fig. 12 is a schematic illustration of a brake pedal for controlling the braking operation of a vehicle in which any of the hereinbefore illustrated power absorption braking mechanism is installed.

The present invention is directed at the provision of a power absorption mechanism of the electromagnetic eddy current type, more specifically described by my co-pending applications Serial No. 693,061, now Patent No. 2,497,402 issued February 14, 1950 and Serial No. 38,543, now abandoned, filed respectively August 26, 1946 and July 13, 1948, adapted to be associated with a liquid cooled vehicle engine and utilized as an auxiliary vehicle brake and as an engine heat booster.

It has become essentially necessary on heavy duty vehicles such as trucks, trailers and the like especially where these heavy duty vehicles are required to traverse mountainous terrain to provide auxiliary braking means so as to remove the high sustained loads and subsequent excessive wear of conventionally employed brakes in the braking of said vehicles or in retarding same in the descent thereof down steep or long grades. Simultaneously with the normal ascent and descent of the vehicles in negotiating mountainous terrain, varying engine operating conditions result wherein while during the ascent the engine is operating at substantially peak load thereby causing the engine to become hot whereas it operates at no load on descent thus causing an extreme change in the temperature of the cooling liquid of the engine. Through the utilization of a power absorption braking mechanism as herein devised as an auxiliary brake upon a power output member of a vehicle and so designing the mechanism in association with the engine cooling system for the purpose of dissipating the heat generated by the brake, a two-fold use of the mechanism can be made, that of a brake and as an engine cooling medium heat booster. It is to be recognized in the employment of this mechanism in heavy duty vehicles that wherein auxiliary braking is used to retard the motion of the vehicle, the heat dissipated by the brake is absorbed by the liquid in the engine cooling system thereby preventing overcooling and thus maintaining the engine temperature at a higher level comparable to the temperature of the engine when under load during ascent.

In the operational use of the power absorption mechanism previously as a brake or retarder for its associated vehicle and as a secondary heat booster source, the amount of braking can be effected through the controlled movement of the brake pedal arranged in association with the electrical current supply circuit for the mechanism in the actuation of either a make and break switch or a variable resistance control switch, or through the provision of a manually controllable rheostat switch associated with the supply circuit.

The power absorption braking mechanism as herein utilized for general vehicle operation effective for both auxiliary braking and engine heat boosting can be arranged at any place in the output gearing of the vehicle so as to be operative to impose a braking force on the gearing for the retardation of vehicle motion. The heat so dissipated in a braking operation is appropriately piped to the vehicle engine to provide for the heat boosting thereof.

By arranging the power absorption mechanism with relation to its engine driving source, wherein the input member thereof is driven directly off the crankshaft or other power output member of the engine it is possible to provide control means in the electrical supply circuit of the mechanism effective to permit of the operation of the mechanism when the engine is in operation under condition wherein the vehicle propelled by the engine is motionless during engine idling or warm-up period. Through the operation of the mechanism independent of the transmission of power for driving the vehicle it is possible in warming up the engine upon the starting thereof especially in cold weather to speed up the warming thereof and lessen the warm-up period or to maintain the engine at higher operating temperature under idling conditions comparable to the engine temperature when the engine is under normal operating load.

Referring to Fig. 1 of the drawings for more specific details of the invention, 10 represents a power absorption braking unit associated with a liquid cooled engine 12 and having driving relation with a power output shaft 14 of a transmission, not shown, driven from the engine.

The power absorption braking mechanism 10, as shown by Fig. 1, is of the eddy current electromagnetic type comprising a rotor 16 splined or otherwise suitably secured to the output shaft 14 of the transmission and an associated drum member 18 encompassing the outer periphery of rotor 16 in radial spaced relation thereto, the purpose of which will hereinafter appear.

The rotor 16 is of the type disclosed by my previously mentioned Patent No. 2,497,402, consisting basically of a pair of identical annular members 20 and 22 of cross-sectional V-shape fixedly mounted in adjacent opposed relationship upon a hub 24 and providing therebetween an annular space for the reception of a ring shaped electromagnetic coil 26, said coil being supplied current from a battery or other suitable source of electrical power by way of current conveying brush 28 cooperating with a lead line 30 from the coil.

The members 20 and 22 forming the field body of the power absorption unit are each provided with pole arms 32 axially extended in alternately overlapping relation to one another externally of coil 26, said arms at their circumferential periphery being spaced from the internal annular surface of drum 18.

The drum member 18 is adapted to be bolted or otherwise fixedly secured to the housing 34 of the transmission for the stationary arrangement thereof and has arranged in circumferential relation thereon a liquid tank or jacket 36, said tank having inlet and outlet connections 38 and 40 respectively connected by way of conduit 42 and 44 with the engine cooling liquid circulating system of the engine, conduit 42 having connection with the outlet 46 of an engine radiator 48 and the conduit 44 having connection with the inlet 50 of a liquid circulating pump 51 incorporated in the cooling system of the engine. The outlet from the pump is connected to the engine block 52 providing for the circulation of liquid therethough. The liquid passing through the engine block is controlled for recirculation by a by-pass thermostat 53 arranged at the outlet therefrom permitting of the continual passage of liquid thereby for circulation back to the inlet to the engine. Under normal operating condition of the engine wherein the circulation of the liquid through the engne by the pump 51 is ample to maintain the engine at its desired operating temperature, the valve 54 of the thermostat controls the passage of the liquid from the engine block through engine outlet connection 66 to the inlet 56 of the radiator by way of conduit 57 and the by-pass of the thermostat.

The liquid discharged through the by-pass of thermostat 53 is fed by by-pass conduit 58 to the conduit 42 on the inlet side of tank 36 of mechanism 10, thereby assuring the continual circulation of cooling liquid at all times and thus provides an effective, quick medium for transferring heat from the mechanism 10 upon the operation thereof to the engine cooling system. The by-pass thermostat 53 is clearly illustrated in Fig. 10 with valve 54 in partially open position for through circulation of the liquid to the radiator, as well as illustrating the partial open communication through the by-pass of the thermostat. The valve 54 is further operable in one direction upon the upward movement of the bellows of the thermostat effecting a pivotal movement of the valve about its pivot axis resulting in a downward closing action of the left side of the valve as viewed in Fig. 10 to shut off the by-pass of the liquid through conduit 58 or in the opposite direction to close off passage from the engine block through conduit 57 through a similar but opposite pivotal action of the valve about its axis.

If it is desired to provide a quicker transfer of heat from the mechanism 10 to the thermostat 53 for a quick response thereof to open the valve 54 and provide a circulation of liquid through the radiator for an effective cooling thereof a bleed conduit 59 is connected between the tank 36 and chamber in which the thermostat is located for conveying liquid heated in the tank to the thermostat bellows and thereby insure an ample cooling of the liquid to be circulated through the tank 36 and engine. The inlet connection 38 on the tank includes a tube portion 60 extending into the tank and directed away from the outlet connection 40 so as to provide for the passage of the liquid entering the tank to circulate about substantially the full circumferential area of the outer periphery 61 of drum 18 in the course of its flowing between the inlet and outlet of the tank. The arrows A indicate the course of liquid flow through the cooling system both with regard to the by-pass flow of liquid and the flow through the radiator when valve 54 of the thermostat is open.

The chamber 36 serves with regard to power absorption braking unit 10 a similar function as the liquid cooled engine block 52 serves to the engine, that of a liquid jacket through which liquid is circulated for effectively dissipating heat that is produced by its associated medium, the engine in the case of the engine block and the power absorption braking unit in the case of tank 36.

By utilizing the drum member as an element of the tank it is possible to provide for the circulation of liquid therearound to effectively absorb the heat generated in the drum member without interfering with the normal operation of the brake as would be the case if the liquid were to be circulated between the drum and rotor. The radiator 48 because of its relation to the engine and tank 36 functions as a liquid heat exchange apparatus for both the engine and power absorption braking unit.

The power absorption unit 10 in its association with the engine as shown by Fig. 1 is adapted to be controlled for operation by an electrical circuit 62 shown by Fig. 6 supplying current to coil 29 from battery 63. The circuit includes therein a switch 64 of the make and break or rheostatic type for controlling the flow of current to the coil adapted to be actuated by a conventional brake pedal 66 of the vehicle propelled by engine 12 effective upon actuation of the brake pedal to complete circuit 62 for the supply of energizing current to the coil. With reference to circuit 62 it is to be recognized that instead of switch 64 being actuated by the brake pedal 66 it could be actuated by any suitable manual control element effective to control the current supply similarly to the brake pedal actuation. Upon the energization of the coil, eddy currents are created between the rotor and drum resulting in placing a drag on the rotor, said drag effecting a resultant retardation of the transmission output shaft 14 and vehicle driven thereby. Simultaneously with the absorption of heat by the drum 18 and the generation of heat therein the liquid circulated through the chamber 36 and liquid circulating system of the engine draws heat therefrom resulting in raising the temperature of the liquid in the engine thereby providing for a higher temperature of operation thereof.

It should be readily conceivable that the power absorption unit is most desirable for use as an auxiliary braking or retarding device upon heavy load carrying vehicles in the descent of said vehicles down long grades at which time the vehicle engine is generally allowed to idle because it is not necessary to drive the vehicle, and it is under these conditions of operation that the heat dissipated by the unit 10 during a braking operation is useful to maintain the engine temperature at a raised level comparable to general load driving conditions to which the engine is imposed.

Figure 2:
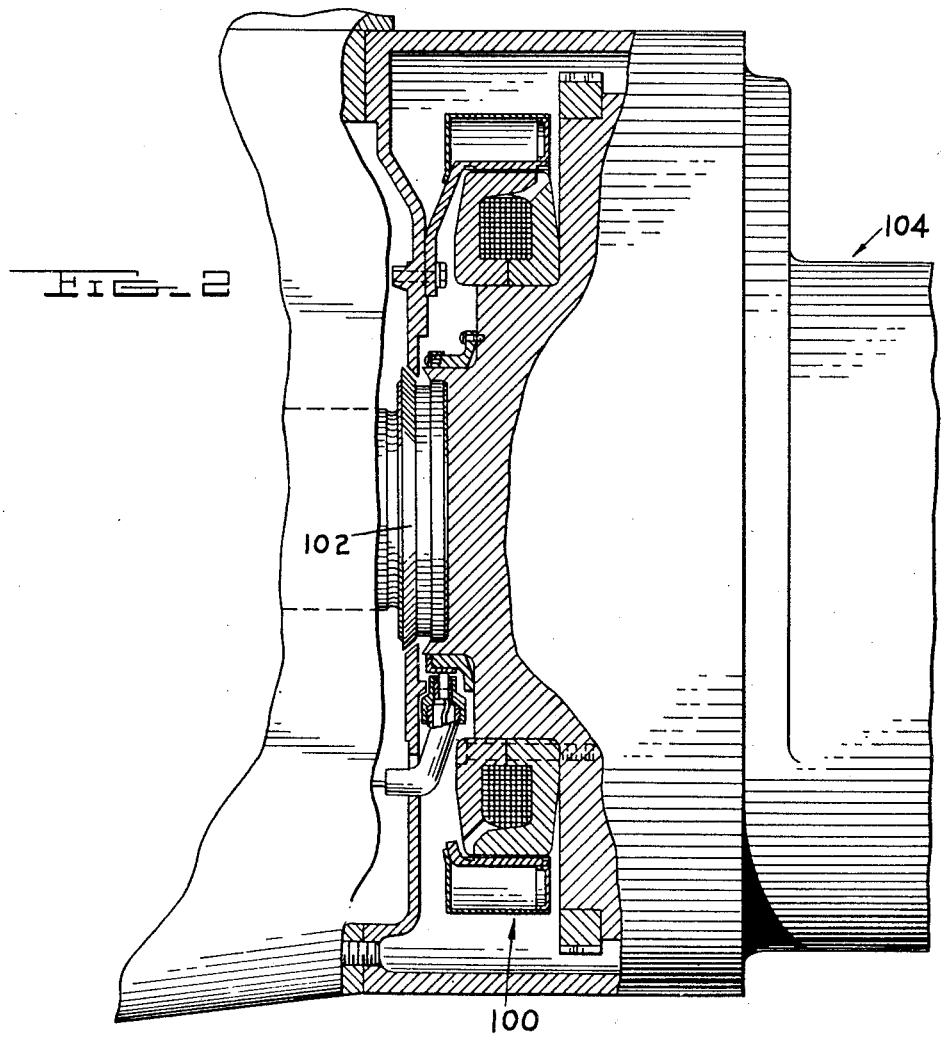
Fig. 2 is a fragmentary vertical cross-sectionalized view of a power absorption mechanism illustrated in different installation position than the mechanism of Fig. 1.

Fig. 2 illustrates the installation of a power absorption unit 100 similar to unit 10 wherein the unit is driven directly off an engine crankshaft 102, said unit being disposed between the engine and transmission therefor represented by transmission housing 104.

Fig. 3 illustrates the utilization of a power absorption unit 200 of the type illustrated by the mechanism more specifically shown and described in my previously mentioned abandoned application Serial No. 38,543 filed July 13, 1948, wherein a drum 202 completely encases a rotor 204 therein with a magnetic material 206 therebetween effective to increase the torque transmitting characteristics of the unit as compared to the unit of Fig. 1 of like size. The unit 200 as shown by Fig. 3 is adapted for use similarly to unit 10 of Fig. 1.

Fig. 4 is directed to the provision of a power absorption unit 300 of heavier duty use and higher power transmitting characteristics than the previously described units in that a pair of rotors 302 and 304 of similar construction are employed in relation to a drum member 306. The rotors 302 and 304 are fixedly secured together and operate as a single unit. The drum member 306 similarly to drum member 202 of unit 200 encases the rotors therein and has a magnetic material 308 interposed therebetween for improving the torque transmitting qualities thereof as compared to an eddy current electromagnetic mechanism not employing said material. It is to be realized that any of the units 10, 100, 200 and 300 can be utilized in place of one another depending upon the power absorption qualities desired and that each can assume the opposite nature of being either entirely eddy current or a combination of eddy current and magnetic material type of power absorption means. Furthermore, any of the units can be arranged in cooperation with any power transmitting element of the vehicle to which it is adapted wherein the operation of the unit would be effective to brake or retard the motion of the vehicle as required.

Fig. 8 illustrates diagrammatically a modified electric circuit 400 for supplying and controlling the supply of current to the electromagnetic coils of the various power absorption units comprising a battery 402 as the source of electrical power, a manually set rheostat 404 to govern the amount of current supplied to the coil as a means of controlling the maximum amount of braking desired, a switch 406 of the make and break type actuated as by a brake pedal 408, a second switch 409 of the make and break type adapted to be manually actuated to break the circuit when the vehicle is in low gear position thereby making it impossible to over torque the rear axle of the vehicle and a coil 410 representive of the electromagnetic coils utilized by any of the hereinbefore defined power absorption mechanisms.

The switch 409 is requisite primarily for the power absorption mechanism arranged intermediate the engine and transmission or forward of the engine wherein the power input thereto is derived directly off of the crankshaft or other major power output member of the engine under which conditions it becomes imperative to provide means for positively assuring the non-operation of the mechanism so as to prevent the overtorqueing of the axle under conditions wherein the axle is being driven at the low gear operation of the vehicle. The switch can be dispensed with for installation use of the mechanism such as shown by Fig. 1.

Figure 9:
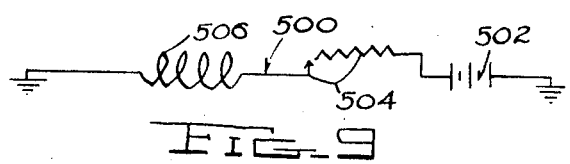
Fig. 9 is a further modified form of electrical circuit for control of operation of any of the illustrated mechanisms of Figs. 1, 2, 3, and 4.

Fig. 9 illustrates diagrammatically a modified form of electric circuit 500 from that of Figs. 6 and 8 for use with any of the devices of Figs. 1, 2, 3 and 4 comprising a battery 502 as the source of electrical power, a manually operable variable resistance switch 504 and a coil 506 representative of the coils of the various power absorption mechanisms.

Circuit 500 provides a simple means for manually controlling the current supply to the coil 506 wherein it may be desired to have the switch control 504 independent of the operation of the vehicle brake pedal as in the case of circuit 400, such that the vehicle operator can actuate the braking means at will.

Fig. 11 is directed at the provision of a combination cooling system for the engine 12 and the mechanism 10 or the like differing from the structure of Fig. 1 in the utilization of a conventional type of thermostat 600 in place of the by-pass thermostat 53 and a liquid flow circuit wherein the pump 51 circulates the liquid through the mechanism 10 prior to the delivery therefrom into the engine block 52. Conduits 42 and 44 represent as in Fig. 1 the inlet and outlet conduits to mechanism 10 differing from the structure disclosed thereby in that the conduit 42 is connected to the discharge from the pump 51 and conduit 44 is connected to the inlet to the engine block 52. A conduit 601 is provided for connecting the intake of the pump with the outlet of the radiator 48 so as to provide in conjunction with the conduit 57 connected between the discharge from the block and inlet to the radiator by way of mechanism 10 a complete liquid circulating system controlled as by thermostat 600 arranged at the discharge from the block. Through the use of thermostat 600 instead of thermostat 53 as employed in the system of Fig. 1, no liquid can be circulated through the cooling system of Fig. 11 until such time as the temperature of the liquid in the head of the engine adjacent to the thermostat bellows reaches a predetermined amount in accordance with the setting of the thermostat to cause it to open the valve thereof to permit of the circulation of the liquid through the radiator, conduit 601, pump 51, conduit 42, tank 36 of mechanism 10, and conduit 44 for return to the engine block 52 and recirculation therethrough.

It will be readily realized that under these conditions of structural arrangement between the engine cooling system and mechanism 10 that should mechanism 10 be operated at a time when the liquid in the engine block is at a temperature below that for operation of the thermostat the liquid in the tank 37 would be quickly heated without immediately affecting the thermostat action because of the lack of liquid circulation and the delay in conduction of heat through the stationary liquid to the thermostat. This condition could quickly result in an overheating of mechanism 10 and a consequent failure thereof. To overcome this condition a bleed line or conduit 602 is connected between the tank 36 and the chamber for thermostat 600 so as to provide means for quickly transferring the heat produced in the tank 36 upon the operation of the mechanism 10 to the thermostat to thereby open the thermostat valve and permit a circulation of liquid through the radiator for the effective cooling thereof. Arrows B indicate the course of liquid flow through the system with and without the thermostat 600 open.

With reference to the cooling systems of Figs. 1 and 11, it is to be understood that the disclosed positions of the tank 36 of mechanism 10 and the pump 51 are to be construed merely as illustrative arrangements for affording proper liquid circulation and cooling through the engine and mechanism 10 and are not to be viewed as limitations of structure.

Fig. 12 illustrates a form of control pedal 700 as a substitute for the pedals 66 or 408 incorporated in the electrical control circuits shown respectively by Figs. 6 and 8 for the various electromagnetic power absorption braking mechanisms disclosed.

The pedal 700 comprises a main treadle 702 pivoted at 704 having an auxiliary treadle 706 pivoted thereon at a distance or leverage point removed from pivot axis 704, a control switch 708 representative in part of the switch 64 and 406 disclosed in Figs. 6 and 8 respectively, incorporated intermediate the treadles 702 and 706 and a roller or the like 710 secured on the underside of treadle 702 adapted to engage an air brake control valve 712.

The switch 708 which is adapted for controlling the flow of electrical current to the coil of the various power absorption mechanisms hereinbefore defined comprises a spring pressed button and contact point assembly 714 assembled in a suitable mounting arranged on treadle 702 with the button of the switch in engagement with the underside of treadle 706.

The treadles 702 and 706 are so designed relative to one another and the respective switches 708 and 712 that it requires the application of force by the foot of vehicle operator upon the treadle 706 effective to cause a movement of treadle 702, inasmuch as the valve 712 includes a spring pressed button 716 engageable by roller 10 offering more resistance to movement of treadle 702 than button 714 of switch 708 offers treadle 706. The treadle 702 as is the conventional practice is also tensioned by spring means.

not shown, arranged on its pivot axis thereby requiring the application of force sufficient to actuate treadle 102 at a point removed from its axis, this being at the location of treadle 106.

It will be obvious in the operational actuation of treadle 102 that it is possible to solely impress a sufficient force B on treadle 106 effective to close the circuit of switch 108 thus causing an operation of the electromagnetic power absorption braking mechanism associated therewith without causing an actuation of treadle 102 or switch 112. In this manner wherein a full braking operation is not required the vehicle could be solely retarded by the electromagnetic braking mechanism. If it is necessary that a complete vehicle braking operation of the vehicle be desired and the electromagnetic mechanism is insufficient to accomplish same the treadles 106 and 102 are moved simultaneously by force applied directly to treadle 106 thereby causing an actuation of switch 112 controlling the vehicle's conventional power braking system, such as air brakes.

Through the provision of a control pedal such as pedal 100 only one control element is necessary for both braking systems while at the same time any failure of the electromagnetic mechanism does not interfere with the conventional application of brake valve 112 thereby assuring sufficient braking power for the vehicle at all times from the same control.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A combination engine heat boosting and vehicle braking apparatus comprising a power absorption braking mechanism having a member driven from a power output member of the vehicle with which the apparatus is adapted to be associated and a stationary member cooperably associated with the first member, a fluid circulating system for the engine, a fluid circulating system for the stationary member of the absorption mechanism having communication with the fluid circulating system for the engine, and means for controlling the operation of the power absorption mechanism.

2. A combination engine heat boosting and vehicle braking apparatus comprising an electromagnetic power absorption mechanism having an input member thereof driven from the crankshaft of the engine with which the mechanism is adapted to be associated, and a stationary member cooperable with the first member, a liquid circulating system associated with the stationary member and the engine, an electrical circuit supplying exciting current to the mechanism, and a switch for controlling the supply of current to the mechanism.

3. An engine heat boosting apparatus comprising a magnetic power absorption device driven from a power transmitting element of a vehicle adapted to be associated therewith comprising a rotor connected to a power output member and a stationary drum member associated with the rotor, a liquid jacket affixed to the drum, a liquid circulating system interconnecting the engine and jacket, and a manually operated means for controlling the operation of the device.

4. A combination liquid cooled engine heat boosting and vehicle braking mechanism comprising an electromagnetic power absorption device adapted to be associated with an engine driven vehicle comprising a rotor connected to a power output member of the vehicle, a stationary drum cooperably associated with the rotor, an electromagnetic coil mounted on the rotor and a liquid jacket circumferentially encompassing the drum, a liquid circulating system interconnected between the liquid jacket and the liquid cooling system of the engine, a source of electrical current for the coil, a brake pedal actuated switch for controlling the current supply to the coil, and an adjustable rheostatic switch for controlling the amount of current to be supplied to the coil.

5. A combination liquid cooled engine heat boosting and vehicle braking mechanism comprising an electromagnetic power absorption device adapted to be associated with an engine driven vehicle comprising a rotor connected to a power output member of the engine, a stationary drum cooperably associated with the rotor, an electromagnetic coil mounted on the rotor and a liquid jacket circumferentially encompassing the drum, a liquid circulating system interconnected between the liquid jacket and the liquid cooling system of the engine, a source of electrical current for the coil, a brake pedal actuated switch for controlling the current supply to the coil, an adjustable rheostatic switch for controlling the amount of current to be supplied to the coil, and a manually actuated switch for controlling the supply of current to the coil independent of the brake pedal switch.

6. In combination with a liquid cooled engine driven vehicle, an engine heat boosting and vehicle braking apparatus comprising an electromagnetic power absorption device comprising a rotor driven from the output shaft of the transmission for the vehicle, a stationary drum cooperably associated therewith, an electromagnetic coil associated with the rotor, and a liquid tank mounted on the external periphery of the drum, a liquid circulating system intercommunicating between the tank and engine liquid cooling system, an electrical circuit for supplying electrical current to the electromagnetic coil, a brake pedal actuated switch in the circuit, and a manually adjustable rheostat in the circuit.

7. In combination with a liquid cooled engine driven vehicle, an engine heat boosting and vehicle braking mechanism comprising an electromagnetic power absorption device comprising a rotatable member connected to the engine crankshaft, a stationary member cooperable therewith, an electromagnetic coil affixed to the rotatable member and a liquid conveying means associated with the stationary member, liquid conveying conduits providing for circulation between the engine and liquid conveying means of the stationary member, a source of electrical excitation for the coil, and a pair of independently actuated switches for controlling the supply of exciting current to the coil.

8. In combination with a liquid cooled engine driven vehicle, an engine heat boosting and vehicle braking mechanism comprising an electromagnetic power absorption device including a rotor driven from a power transmitting element of the vehicle, a stationary drum cooperably associated therewith, an electromagnetic coil associated with the rotor, and a liquid conveying medium arranged on the drum, a liquid circulating system intercommunicating between the conveying medium and engine cooling system, a circuit for supplying current to the coil, and a manually actuated variable resistance switch in the circuit.

9. In combination with a liquid cooled engine driven vehicle, a power absorption braking mechanism comprising an eddy current electromagnetic device including a rotor driven from a driven element of the vehicle, a stationary drum cooperably associated with the rotor, an electromagnetic coil arranged on the rotor, a liquid circulating means arranged on the external periphery of the drum, means providing for the circulation of liquid between the engine and liquid circulating means arranged on the drum, a source of electrical current for the coil and switch means for controlling the current supply to the coil.

10. In combination with a vehicle engine having a liquid cooled circulating system including a radiator, a liquid pump, liquid conveying conduits arranged between the radiator and respective inlet and outlet to the engine, a by-pass thermostat in the outlet from the engine, and a by-pass conduit between the by-pass through the thermostat and the inlet conduit to the engine, a power absorption braking mechanism comprising an element driven from a power transmitting member driven by the engine, a retarding element cooperable with the driven element and a heat exchanger cooperable with the retarding element having communication in the inlet conduit to the engine.

11. In combination with a vehicle engine having a liquid cooled circulating system including a radiator, a liquid pump, liquid conveying conduits arranged between the radiator and respective inlet and outlet to the engine, a by-pass thermostat in the outlet from the engine, and a by-pass conduit between the by-pass through the thermostat and the inlet conduit to the engine, a power absorption braking mechanism comprising an element driven from a power transmitting member driven by the engine, a retarding element cooperable with the driven element and a heat exchanger cooperable with the retarding element having communication in the inlet conduit to the engine and communication by way of a liquid bleed line to the by-pass thermostat.

12. In combination with an engine driven vehicle, the engine of which has a liquid cooling system incorporated therewith comprising a radiator, liquid conveying conduits providing communication therebetween with the engine block, a pump in the inlet conduit to the engine block for circulating liquid through the cooling system, a by-pass thermostat in the outlet conduit from the engine block, and a by-pass conduit providing communication between the thermostat by-pass and inlet conduit to the engine block, an electromagnetic power absorption mechanism comprising a rotor driven from a power transmitting member of the vehicle, a braking element cooperable with the rotor, and a heat exchanger forming part of the braking element having communication with the inlet conduit of the engine and bleed line communication with the thermostat chamber.

13. In combination with an engine driven vehicle, the engine of which has a liquid cooling system incorporated therewith comprising a radiator, liquid conveying conduits providing communication respectively with the inlet and outlet of the engine block, a pump in the inlet conduit of the engine, and a liquid flow control thermostat in the outlet conduit of the engine, an electromagnetic power absorption mechanism comprising a rotor driven from a power transmitting element of the vehicle, a stationary drum cooperable with the rotor and a heat exchanger arranged on the external periphery of the drum having communication in the inlet conduit of the engine block and communication with the outlet conduit of the engine block in close proximity to the thermostat by way of a liquid bleed line.

14. A combination liquid cooled engine heat boosting and vehicle braking mechanism comprising an electromagnetic power absorption device adapted to be associated with an engine driven vehicle comprising a rotor connected to a power output member of the vehicle, a stationary drum cooperably associated with the rotor, an electromagnetic coil mounted on the rotor and a liquid jacket circumferentially encompassing the drum, a liquid circulating system interconnected between the liquid jacket and the liquid cooling system of the engine, a source of electrical current for the coil, a brake pedal mechanism, a switch actuated by movement of the brake pedal mechanism for controlling the current supply to the coil, and a second switch actuated by movement of the brake pedal mechanism for controlling the operation of a conventional braking system for the vehicle in which the combination heat boosting and braking mechanism is incorporated.

15. In combination with a liquid cooled engine driven vehicle, an engine heat boosting and vehicle braking apparatus comprising an electromagnetic power absorption device, comprising a rotor driven from the output shaft of the transmission for the vehicle, a stationary drum cooperably associated therewith, an electromagnetic coil associated with the rotor, and a liquid tank mounted on the external periphery of the drum, a liquid circulating system intercommunicating between the tank and engine liquid cooling system, an electrical circuit for supplying electrical current to the electromagnetic coil, a brake pedal mechanism for the vehicle comprising a spring tensional pivotal treadle, an auxiliary treadle pivotally mounted on the first treadle, a switch mounted on the first treadle arranged in the electrical circuit for the coil, engageable for action by movement of the auxiliary treadle and a second switch for controlling the conventional braking system of the vehicle actuated by movement of the first treadle.

HOWARD J. FINDLEY.

REFERENCES CITED

The following references are of record in the file of this patent:

UNITED STATES PATENTS

| Number | Name | Date |
|---|---|---|
| 2,310,269 | Waeber | Feb. 9, 1943 |